US011906930B2

(12) United States Patent
Hernandez et al.

(10) Patent No.: US 11,906,930 B2
(45) Date of Patent: Feb. 20, 2024

(54) ELASTIC RETAINING MEMBER FOR FIXING A TIMEPIECE COMPONENT ON A SUPPORT ELEMENT

(71) Applicant: Nivarox-FAR S.A., Le Locle (CH)

(72) Inventors: Ivan Hernandez, Cressier (CH); Pierre Cusin, Villars-Burquin (CH)

(73) Assignee: Nivarox-FAR S.A., Le Locle (CH)

( * ) Notice: Subject to any disclaimer, the term of this patent is extended or adjusted under 35 U.S.C. 154(b) by 429 days.

(21) Appl. No.: 17/272,714

(22) PCT Filed: Sep. 4, 2019

(86) PCT No.: PCT/EP2019/073513
§ 371 (c)(1),
(2) Date: Mar. 2, 2021

(87) PCT Pub. No.: WO2020/057969
PCT Pub. Date: Mar. 26, 2020

(65) Prior Publication Data

US 2021/0216043 A1 Jul. 15, 2021

(30) Foreign Application Priority Data

Sep. 21, 2018 (EP) .................................... 18196014

(51) Int. Cl.
*G04B 17/34* (2006.01)

(52) U.S. Cl.
CPC .................................... *G04B 17/34* (2013.01)

(58) Field of Classification Search
CPC .............................. G04B 17/34; G04B 13/022
See application file for complete search history.

(56) References Cited

U.S. PATENT DOCUMENTS

2009/0135679 A1 5/2009 Musy et al.
2013/0047437 A1* 2/2013 Daout .................. G04B 17/345
403/345

(Continued)

FOREIGN PATENT DOCUMENTS

CH 698 794 B1 10/2009
CH 706 526 A2 11/2013

(Continued)

OTHER PUBLICATIONS

International Preliminary Report on Patentability and Written Opinion of the International Searching Authority dated Mar. 23, 2021 in PCT/EP2019/073513, 16 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

An elastic retaining member for fixing a timepiece component on a support element includes an opening into which the support element can be inserted, and rigid arms and elastic arms defined between connection areas of the member. The rigid arms and the elastic arms are configured to ensure elastic clamping of the support element in the opening, each of the rigid arms being provided with a single flat contact area and configured to cooperate with a corresponding convex contact portion of the support element.

20 Claims, 2 Drawing Sheets

(56) References Cited

U.S. PATENT DOCUMENTS

| | | | | |
|---|---|---|---|---|
| 2015/0023140 | A1* | 1/2015 | Daout | G04B 1/145<br>368/177 |
| 2016/0370764 | A1 | 12/2016 | Cusin et al. | |
| 2018/0107162 | A1* | 4/2018 | Hernandez | G04B 17/345 |
| 2018/0150029 | A1 | 5/2018 | Shibuya et al. | |

FOREIGN PATENT DOCUMENTS

| | | | | |
|---|---|---|---|---|
| CH | 707 288 | A1 | 5/2014 | |
| CH | 714001 | A1 * | 1/2019 | G04B 17/06 |
| CN | 101750954 | A | 6/2010 | |
| CN | 103930837 | A | 7/2014 | |
| CN | 104898398 | A | 9/2015 | |
| CN | 1680892 | A | 10/2015 | |
| CN | 106257348 | A | 12/2016 | |
| CN | 107942639 | A | 4/2018 | |
| EP | 1826635 | A1 * | 8/2007 | G04B 13/022 |
| EP | 1 857 891 | A1 | 11/2007 | |
| EP | 2 219 083 | A1 | 8/2010 | |
| EP | 2219083 | A1 * | 8/2010 | G04B 13/021 |
| EP | 2 372 473 | A2 | 10/2011 | |
| EP | 2 889 701 | A2 | 7/2015 | |
| EP | 3 106 931 | A1 | 12/2016 | |
| EP | 3 309 625 | A1 | 4/2018 | |
| EP | 3 327 514 | A2 | 5/2018 | |
| JP | 2013-234901 | A | 11/2013 | |
| JP | 2018-63250 | A | 4/2018 | |

OTHER PUBLICATIONS

International Search Report dated Nov. 4, 2019 in PCT/EP2019/073513 filed on Sep. 4, 2019, 3 pages.

Japanese Office Action dated Apr. 26, 2022, in Japanese Patent Application No. 2021-512488 (with English translation), 8 pages.

Combined Chinese Office Action and Search Report dated Aug. 23, 2021 in Chinese Patent Application No. 201980062071.5 (with English translation), 14 pages.

* cited by examiner

ELASTIC RETAINING MEMBER FOR FIXING A TIMEPIECE COMPONENT ON A SUPPORT ELEMENT

FIELD OF THE INVENTION

The invention relates to an elastic retaining member for fixing a timepiece component on a support element.

The invention also relates to an elastic retaining member-timepiece component assembly and an assemblage of such an assembly with the support element.

The invention also relates to a method for performing such an assemblage.

The invention, in addition, relates to a horological movement comprising at least one such assemblage.

Finally, the invention relates to a timepiece comprising such a movement.

BACKGROUND OF THE INVENTION

In the prior art, elastic retaining members such as timepiece collets which participate in assembling balance-springs on balance shafts in a horological movement by means of elastic clamping, are known.

However, such elastic retaining members have the major disadvantage of imposing, in the context of performing such assemblages, complex, long and expensive mounting operations due to the fact that these members have holding torques on these balance shafts which are low and limited.

SUMMARY OF THE INVENTION

The purpose of the present invention is to overcome all or part of the disadvantages mentioned above by proposing an elastic retaining member which has a high holding torque, in particular to facilitate/simplify the mounting operations of an assemblage of an elastic retaining member-timepiece component assembly with a support element as well as to ensure sufficient hold to ensure that it is retained in position in the plane and to guarantee its angular position during the life of the component.

To this end, the invention relates to an elastic retaining member for fixing a timepiece component on a support element, comprising an opening into which said support element can be inserted, the retaining member comprising rigid arms and elastic arms defined between connection areas 9 of the member 1, these arms contributing to ensure elastic clamping of the support element in the opening, each rigid arm being provided with a single flat contact area of the retaining member able to cooperate with a corresponding convex contact portion of the support element.

Thus, thanks to these features, the elastic retaining member is then able to withstand a significant elastic clamping and therefore to store a large amount of elastic energy when it is constrained in order to restore a large holding torque, in particular thanks to a high rigidity of this elastic retaining member induced in particular by significant volumes (or amounts) of material constituting its rigid arms which comprise the inner and outer structures. It should be noted that these large volumes of material are more precisely comprised in the contact areas which are placed under loads (or under stress) during the insertion of the support element into this retaining member.

In addition, it will be noted that this elastic retaining member is configured so that this storage of elastic energy leads to stresses which remain admissible with regard to the material which constitutes such a retaining member such as silicon. Indeed, the contact areas 8 have a flat surface which thus allows them to achieve with the contact portions a piano-convex-type contact configuration, thus contributing to avoid/prevent any damage to the retaining member 1 by the appearance of fractures or else cracks.

In other embodiments:

- the contact area is distributed over a convex inner face of each rigid arm of the retaining member;
- each contact area is defined on a convex inner face of each rigid arm of the retaining member, extending over all or part of a thickness of this retaining member;
- each contact area is able to cooperate with the corresponding contact portion of the support element by being in a plano-convex-type contact configuration;
- the elastic retaining member comprises as many contact areas as there is contact portion;
- the elastic retaining member comprises as many rigid arms as there are elastic arms;
- the rigid arms and the elastic arms are arranged successively and alternately in the retaining member;
- each rigid arm is connected at its two opposite ends to two different elastic arms;
- each rigid arm has a volume of material greater than the volume of material constituting each elastic arm;
- each elastic arm has a cross section which is less than a cross section of each rigid arm;
- each elastic arm has a cross section which is constant throughout the body of this elastic arm;
- the elastic retaining member comprises a point of attachment with the timepiece component;
- the elastic retaining member is a collet for fixing the timepiece component such as a balance-spring to a support element such as a balance shaft, and
- the elastic retaining member is made of a silicon-based material.

The invention also relates to an elastic retaining member-timepiece component assembly for a horological movement of a timepiece comprising such a retaining member.

In particular, the assembly is made in one piece.

The invention also relates to an assemblage for a horological movement of a timepiece comprising an elastic retaining member timepiece component assembly, said assembly being fixed to a support element.

The invention further relates to a horological movement comprising at least one such assemblage.

The invention also relates to a timepiece comprising such a horological movement.

The invention also relates to a method for performing an assemblage of an elastic retaining member timepiece component assembly with a support element according to the preceding claim, comprising:

- a step of inserting the support element into the opening of the elastic retaining member of said assembly, said step comprising a sub-step of elastically deforming the elastic retaining member provided with a phase of displacing the rigid arms of the elastic retaining member inducing a double elastic deformation of the elastic arms of this elastic retaining member, and
- a step of fixing the retaining member on the support element comprising a sub-step of performing a radial elastic clamping of the retaining member on the support element.

BRIEF DESCRIPTION OF THE DRAWINGS

Other features and advantages will emerge clearly from the description which is given below, in an indicative and non-limiting manner, with reference to the appended drawings, wherein.

DETAILED DESCRIPTION OF THE PREFERRED EMBODIMENTS

FIGS. 1 to 4 show an embodiment of the elastic retaining member 1 for fixing a timepiece component 2 on a support element 3. By way of example, the elastic retaining member 1 can be a collet for fixing the timepiece component 2 such as a balance-spring to a support element 3 such as a balance shaft.

Figure 5:
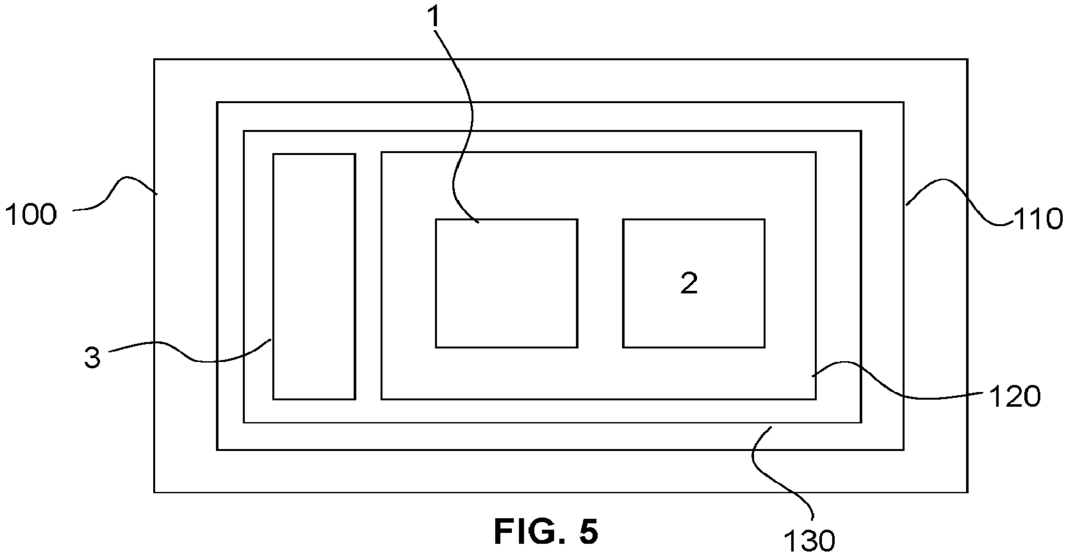
FIG. 5 shows a timepiece comprising a horological movement provided with at least one assemblage including an elastic retaining member-timepiece component assembly fixed to a support element, according to one embodiment of the invention.
Figure 6:
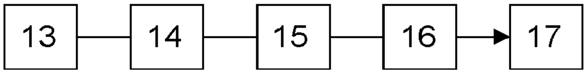
FIG. 6 shows a method for performing such an assemblage of an elastic retaining member-timepiece component assembly with a support element.

In this embodiment, this retaining member 1 can be comprised in an elastic retaining member—timepiece component assembly 120 visible in FIG. 5 and which is provided to be arranged in a horological movement 110 of a timepiece 100. Such an assembly 120 can be a single piece made of a material called “fragile” material, preferably a micro-machinable material. Such a material can comprise silicon, quartz, corundum or else ceramic.

It will be noted that in a variant of this assembly, only the elastic retaining member 1 can be made of such a material called “fragile” material, the timepiece component 2 then being made of another material.

This assembly 120 can belong an assemblage 130 for the horological movement 110, by being fixed to the support element 3, for example by elastic clamping. It will be noted that this assemblage 130 was designed for applications in the watchmaking field. However, the invention can perfectly be implemented in other fields such as aeronautics, jewellery, or else automotive.

Figure 1:
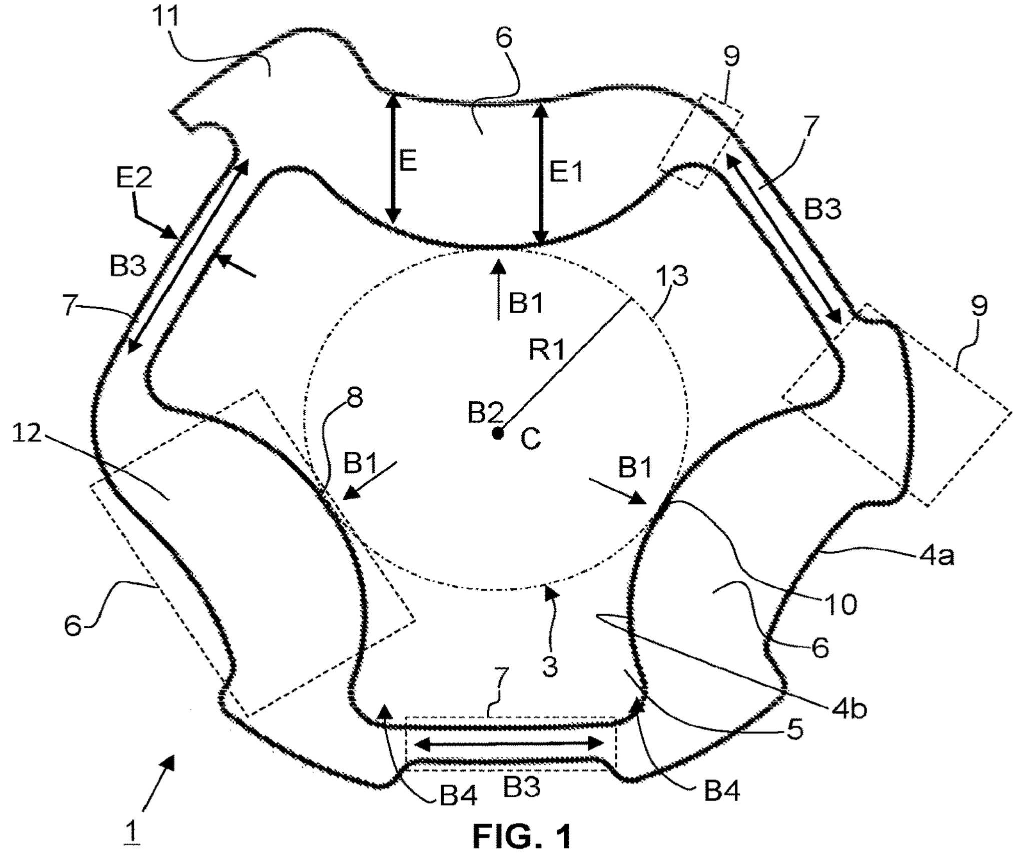
FIG. 1 is a front view of an elastic retaining member for fixing a timepiece component on a support element which is here in a constrained state, according to one embodiment of the invention.
Figure 2:
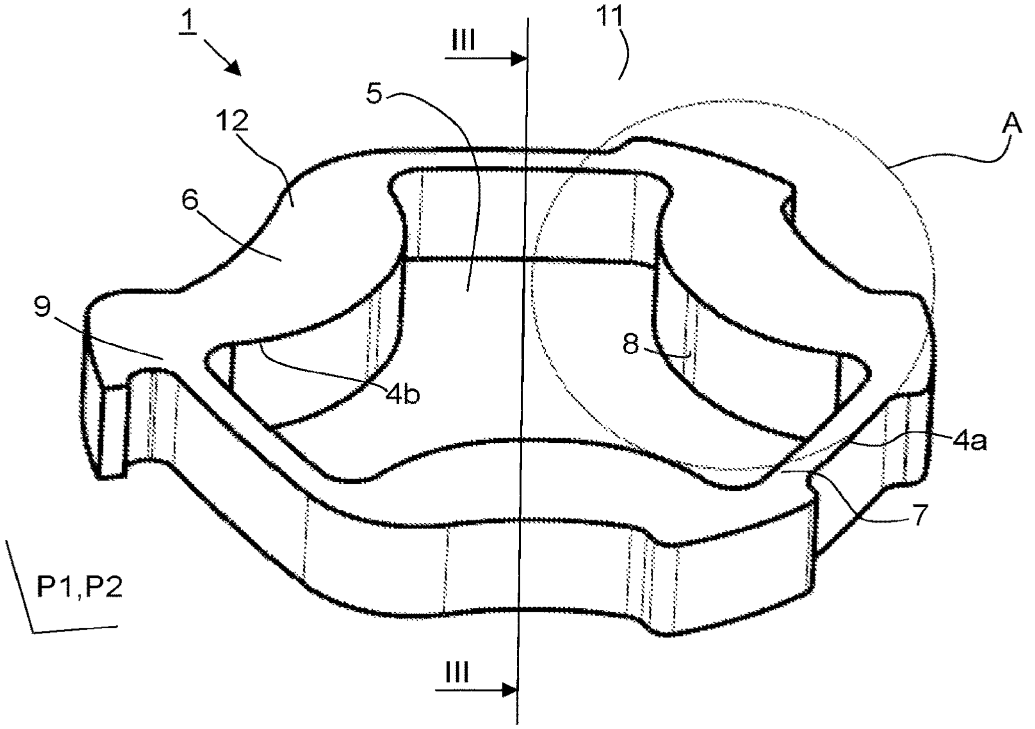
FIG. 2 is a perspective view of the elastic retaining member for fixing the timepiece component on the support element which is here in a rest state, according to the embodiment of the invention.

Such a retaining member 1 comprises an upper face and a lower face 12 which are preferably flat, respectively comprised in first and second planes P1 and P2 visible in FIG. 2, as well as outer and inner structures 4*a*, 4*b*. These outer and inner structures 4*a*, 4*b* respectively comprise outer and inner peripheral walls of this retaining member 1 and have different shapes. More specifically, with regard to the outer structure 4*a*, it may have a generally hexagonal shape, in particular comprising portions having convex shapes. Each of these portions is comprised in a connection area 9 connecting an elastic arm 7 to a rigid arm 6. The elastic 7 and rigid arms 6 each being an elongated part which connects portions of the retaining member 1 to each other. In other words, a rigid arm or an elastic arm extends longitudinally between two connection areas 9 comprised in each of these arms 6, 7. In this context, when the elastic arms 7 are considered, the portions of the organ 1 which are connected to each other are the rigid arms 6, this connection being made at the connection areas 9. Likewise, the rigid arms 6 are considered, the portions of the member 1 which are connected to each other are the elastic arms 7, this connection being made obviously at the connection areas 9. It is therefore understood that each rigid arm is directly connected at each of its two opposite ends to an elastic arm. It will be noted that each rigid and elastic arm which are directly connected to each other comprise the connection area 9 which they share and at which the end of one is directly connected to the end of the other. In addition, it is therefore understood that the elastic and rigid arms are arranged successively and alternately in the retaining member. Each rigid arm is connected to two different elastic arms, which elastic arms are “directly” connected to the other rigid arms of the member 1. This outer structure 4*a* is in particular intended to be connected to the timepiece component 2 by means of at least one attachment point 11 arranged in the outer peripheral wall of the retaining member 1. Regarding the inner structure 4*b*, it has a non-triangular shape. This inner structure 4*b* which comprises the inner peripheral wall of this retaining member 1, participates in defining an opening 5 of such a retaining member 1 into which the support element 3 is intended to be inserted. This opening 5 defines a volume in the retaining member 1 which is smaller than that of a connecting portion of one end of the support element 3 which is intended to be arranged therein. It will be noted that this connecting portion has a circular cross section and comprises all or part of the contact portions 10 defined on the peripheral wall 13 of the support element 3. It will be noted that this support element 3 has a radius of curvature R1 which is visible in FIG. 1.

This retaining member 1 comprises the rigid arms 6 and elastic arms 7 connecting the outer and inner structures 4*a*, 4*b* to one another. It will be noted that this retaining member 1 comprises as many rigid arms 6 as there are elastic arms 7. The rigid arms 6 are here undeformable or almost undeformable and act as elements for stiffening the retaining member 1. Regarding the elastic arms 7, they are able to deform mainly in tension but also in torsion. These rigid arms 6 and these elastic arms 7 are defined or else distributed successively and alternately in this retaining member 1. In other words, these rigid arms 6 are connected to each other by said elastic arms 7. More specifically, each elastic arm 7 is connected at its two opposite ends at connection areas 9 to two different rigid arms 6. Such rigid and elastic arms 6, 7 comprise, in a non-limiting and non-exhaustive manner:

- inner faces comprised in the inner structure 4*b* and which participate in defining together the inner peripheral wall of the retaining member 1 and therefore also the opening 5 of this retaining member 1, and
- outer faces comprised in the outer structure 4*a* and which together define the outer peripheral wall of this retaining member 1.

It will be noted that the inner faces of the elastic arms 7 are essentially flat and the inner faces of the rigid arms 6 are non-flat, for example being of convex shape. In the present embodiment, the convex inner face of each rigid arm 6 therefore comprises the flat contact area 8. This contact area 8 is able to cooperate with the corresponding contact portion 10 of the support element 3. Such a contact area 8 is defined in the inner face by extending substantially over all or part of the thickness of the retaining member 1. In addition, this contact area 8 is flat, comprising a surface which is entirely or partly flat. It will be noted that the contact areas 8 of the rigid arms 6 are provided in particular to cooperate with the contact portions 10 according to a plano-convex-type contact configuration in which configuration where the flat surface of each contact area 8 cooperates with the convex shaped contact portion 10 of the support element 3. It should be noted here that this convex shape of each contact portion 10 is assessed relative to the flat surface of each corresponding contact area 8 opposite to which this portion 10 is arranged. It will be noted that the flat surface of the contact area 8 forms a plane tangent to the diameter of the support element. In other words, the flat surface is perpendicular to the diameter and therefore to the radius R1 of the support element.

In this configuration, the presence of this flat contact area 8 in the inner face of each rigid arm 6 allows a contact pressure to be performed between the retaining member 1 and the support element 3 during the production of a mechanical connection between them, while significantly reducing the intensity of the stresses at this contact areas 8 and the corresponding contact portion 10 of the support element 3 during the assemblage and/or the fixing of this retaining member 1 with the support element 3, which stresses are liable to damage the retaining member 1 by the appearance of fractures/breaks or else cracks.

In the prior art, this contact pressure is estimated from the Hertz pressure equation conventionally but not exclusively implemented for determining a contact pressure between cylindrical or spherical parts having different diameters or radii of curvature. In the present case, this Hertz pressure is defined according to the following equation:

$$P = \left(\frac{E * F}{\pi L R}\right)^{1/2}$$

With:

- E* which is an equivalent modulus of elasticity;
- F which is the radial force also called pressing force or radial load or else contact force undergone by the contact areas 8;
- L which is the guide length corresponding to the length of each contact area, that is to say the thickness of the retaining member 1;
- R which is the relative radius of curvature defined by the following equation:

$$R = \frac{R_1 R_2}{R_1 + R_2}$$

when the contact area 8 and the corresponding contact portion 10 of the support element 3 have different radii of curvature $R_2$ and $R_1$ and are in a convex-convex-type contact configuration.

In the present embodiment, the contact area 8 of each rigid arm 6 is flat and therefore does not have a radius of curvature $R_2$. Such a contact area 8 is able to cooperate with the corresponding contact portion 10 of the support element 3 in the plano-convex-type contact configuration.

Thus, in such a contact configuration, the contact pressure defined by the Hertz pressure equation is less than that relating to convex-convex-type contact configurations during which the contact area 8 which then has a radius of curvature $R_2$ is able to cooperate with the corresponding contact portion 10 of the support element 3. This contact pressure present during the plano-convex-type contact configuration is less than those implemented during the other configurations described above in particular because of the higher value in this context of the relative radius of curvature R resulting from the absence of a radius of curvature for each flat contact area 8 of the retaining member 1 of the present embodiment.

In the plano-convex-type contact configuration where the contact area 8 of each rigid arm 6 is able to cooperate with the corresponding contact portion 10 of the support element 3, the contact pressure is less than those of these other contact configurations of at least 25%.

In this embodiment, the rigid and elastic arms 6, 7 connect the outer and inner structures 4*a*, 4*b* to one another, each further comprising a portion of these outer and inner structures 4*a*, 4*b*. In this retaining member 1, these rigid and elastic arms 6, 7 essentially allow an elastic clamping-type fixing of the support element 3 to be achieved in the opening 5 made in this retaining member 1 which is defined by the inner structure 4*b* and in particular by the inner peripheral wall of this retaining member 1.

As seen above, these rigid arms 6 therefore comprise the only contact areas 8 of the retaining member 1 with the support element 3 which can be defined in all or part of the inner faces of these rigid arms 6. The contact area 8 of each rigid arm 6, otherwise called "contact interface", is provided to cooperate with a peripheral wall 13 of the connecting portion of the support element 3 in particular with the corresponding contact portion 10 defined in this peripheral wall 13 of the support element 3. In this context, the retaining member 1 then comprises three contact areas 8 which participate in achieving a precise centring of the timepiece component 2, for example a balance-spring, in the horological movement 110.

Figure 3:
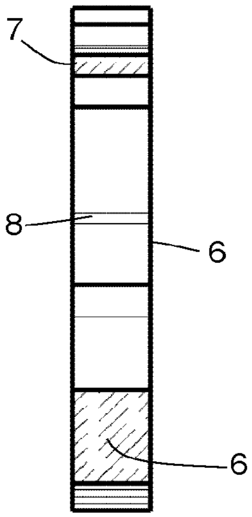
FIG. 3 is a sectional view along III-Ill of FIG. 2.
Figure 4:
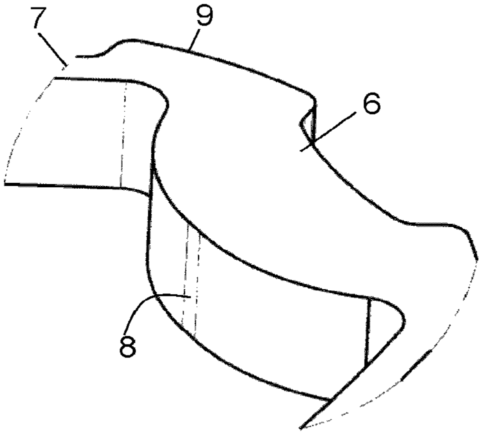
FIG. 4 is a view on a larger scale of portion A of FIG. 2.

With reference to FIG. 3, in this retaining member 1, each rigid arm 6 has a volume of material which is substantially greater or strictly greater than the volume of material constituting each elastic arm 7. In addition, it will be noted that the elasticity or the rigidity of an arm in this retaining member 1 is defined relative to the contact areas 8 of this member 1 more specifically relative to the intensity of the deformation of these rigid or elastic arms when applying a force on these contact areas 8. It will indeed be noted that the outer and inner structures 4*a*, 4*b*, and in particular the inner and outer peripheral walls, are separated from each other in this retaining member 1 by a variable distance E which then changes depending on whether these structures are comprised, for example, in a rigid arm 6 or else an elastic arm 7. Indeed, this distance E is a maximum distance E1 when it is defined between portions of the inner and outer peripheral walls which are comprised in each rigid arm 6, that is to say the maximum distance E1 present between the inner and outer faces of this rigid arm 6. In particular, for each rigid arm 6, this maximum distance E1 is defined between the contact area 8 of each rigid arm 6 and an opposite portion of the outer peripheral wall of this rigid arm 6. Moreover, this distance E is a minimum distance E2 when it is defined between portions of the outer and inner peripheral walls comprised in the elastic arms 7, that is to say the minimum distance E2 present between the inner and outer faces of this elastic arm 7.

It is therefore understood here that each elastic arm 7 has a cross section which is less than a cross section of each rigid arm 6. In other words, the cross section of each elastic arm 7 has an area which is less than an area of the cross section of each rigid arm 6. It will be noted that the cross section of the elastic arm 7 is constant or substantially constant throughout the body of this elastic arm 7 while the cross section of the rigid arm 6 is inconstant/variable throughout the body of this rigid arm 6. In addition, it will be noted that:

the cross section of each rigid arm 6 is preferably a solid or partially solid section which is perpendicular to the longitudinal direction wherein the body of this rigid arm 6 extends, and the cross section of each elastic arm 7 is preferably a solid or partially solid section which is perpendicular to the longitudinal direction wherein the body of this elastic arm 7 extends.

Such a configuration of the rigid and elastic arms 6, 7 allows the retaining member 1 to store a greater amount of elastic energy for the same clamping compared to the retaining members of the prior art. Such an amount of elastic energy stored in the retaining member 1 then allows a greater holding torque of the retaining member to be obtained on the support element 3 in the assemblage 130 of the retaining member-timepiece component assembly 120 with this support element 3. In addition, it should be noted that such a configuration of the retaining member 1 allows elastic energy ratios which are 6 to 8 times greater than those of the retaining members of the prior art to be stored.

It will be noted that the arrangement of the rigid and elastic arms 6, 7 in the retaining member 1 allows, during insertion with clamping, a deformation of each elastic arm 7 allowing the deformation of the whole retaining member 1 to be accommodated with the geometry of the connecting portion of the support element 3 on which it is assembled. In addition, the mode of deformation undergone by each elastic arm is a toroidal torsion coupled with a radial expansion.

With reference to FIG. 5, the invention also relates to a method for performing the assemblage 130 of the elastic retaining member-timepiece component assembly 120 with the support element 3. This method comprises a step 13 of inserting the support element 3 into the opening 5 of the retaining member 1. During this step 13, the end of the support element is presented at the entrance of the opening 5 defined in the lower face 12 of the retaining member 1 in anticipation of the introduction of the connecting portion of this support element 3 into the volume defined in this opening 5. This step 13 comprises a sub-step 14 of elastically deforming the retaining member 1 in particular a central area of this retaining member 1 comprising said opening 5 resulting from the application of a contact force on the contact areas 8 of the rigid arms 6 by the contact portions 10 of the peripheral wall 13 of the connecting portion of the support element 3. This elastic deformation of the central area indeed generates a deformation of the lower face 12 of the retaining member 1 which then has an essentially concave shape, in particular at a portion of this face 12 comprised in the central area of the retaining member 1. In other words, when the central area of the retaining member 1 is deformed, this lower face 12 is no longer flat and is then no longer entirely comprised in the second plane P2.

As previously mentioned, this elastic deformation of the retaining member 1 results from the application of the contact force on the contact areas 8 of the rigid arms 6 by the contact portions 10 of the peripheral wall 13 of the support element 3. Such a deformation sub-step 14 comprises a phase of displacing 15 the rigid arms 6 under the action of the contact force which is applied thereto. Such a displacement of the rigid arms 6 is performed in a direction between a radial direction B1 relative to a central axis C common to the support element 3 and to the retaining member 1, and a direction B2 coincident with this central axis C. It will be noted that this direction B2 is perpendicular to the direction B1 and is oriented in a direction defined from the lower face 12 towards the upper face. The contact force is preferably perpendicular or substantially perpendicular to said contact area 8. During the course of this phase 12, the rigid arms 6 thus displacing under the action of this contact force, generate a double elastic deformation of the elastic arms 7.

A first deformation otherwise called "torsional elastic deformation" of these elastic arms 7. During this torsional deformation, each elastic arm 7 is driven at its two ends in the same direction of rotation B4 by the displacing rigid arms 6, to which arm 6 such ends are connected. It will be noted that only a portion of the body of these elastic arms 7 is torsion-deformable, here the ends of these arms 7. Such a first deformation contributes in particular to improving the insertion of the support element 3 into the opening 5 of the retaining member 1 by participating in preventing any fracture of the retaining member 1 and/or any appearance of a crack in this member 1 when assembled with the support element 3.

A second deformation otherwise called "tensile deformation" or else "extensional elastic deformation" of the elastic arms 7. During this extensional deformation, each elastic arm 7 is pulled at its two ends in the longitudinal direction B3 in opposite directions by the displacing rigid arms 6, to which arms 6 such ends are connected. Such a second deformation contributes in particular to ensure that the retaining member 1 stores a large amount of elastic energy.

This double elastic deformation of the elastic arms 7 can be carried out simultaneously or substantially simultaneously, or else successively or substantially successively. It will be noted in the context of the implementation of the deformation phase that when this double elastic deformation is carried out successively or substantially successively, the first deformation can then be carried out before the second deformation.

This method then comprises a step 16 of fixing the retaining member 1 on the reinforcing element 3. Such a fixing step 16 comprises a sub-step 17 of performing a radial elastic clamping of the retaining member 1 on the support element 3. It is therefore understood that in such a state of constraint, the retaining member 1 stores a large amount of elastic energy which contributes to giving it a substantial holding torque allowing in particular an optimal twist by elastic clamping.

The invention claimed is:

1. An elastic retaining member for fixing a timepiece component on a support element, comprising:

an opening configured to receive the support element; and rigid arms and elastic arms defined between connection areas of the member, the rigid arms and the elastic arms being configured to ensure elastic clamping of the support element in the opening, and each of the rigid arms being provided with a single flat contact area and configured to cooperate with a corresponding convex contact portion of the support element, wherein each of the elastic arms has a linear member with a first end connected to one of the rigid arms and a second end connected to another one of the rigid arms.

2. The elastic retaining member according to claim 1, wherein the single flat contact area is distributed over an inner face of each of the rigid arms of the retaining member.

3. The elastic retaining member according to claim 1, wherein the single flat contact area is defined on a convex inner face of each of the rigid arms of the retaining member, extending over all or part of a thickness of the retaining member.

4. The elastic retaining member according to claim 1, wherein the single flat contact area is configured to cooperate with the corresponding contact portion of the support element and has a plano-convex-type contact configuration.

5. The elastic retaining member according to claim 1, wherein the elastic retaining member comprises a contact area for each contact portion of the support element.

6. An elastic retaining member for fixing a timepiece component on a support element, comprising:

an opening configured to receive the support element; and rigid arms and elastic arms defined between connection areas of the member, the rigid arms and the elastic arms being configured to ensure elastic clamping of the support element in the opening, and each of the rigid arms being provided with a single flat contact area and configured to cooperate with a corresponding convex contact portion of the support element, wherein the elastic retaining member comprises a number of rigid arms equal to a number of elastic arms.

7. The elastic retaining member according to claim 1, wherein the rigid arms and the elastic arms are arranged successively and alternately in the retaining member.

8. The elastic retaining member according to claim 1, wherein each of the rigid arms has two opposing ends respectively connected to two different elastic arms.

9. The elastic retaining member according to claim 1, wherein each of the rigid arms has a volume of material greater than a volume of material constituting each of the elastic arms.

10. The elastic retaining member according to claim 1, wherein each of the elastic arms has a cross section which is smaller than a cross section of each of the rigid arms.

11. The elastic retaining member according to claim 1, wherein each of the elastic arms has a body with a constant cross section.

12. The elastic retaining member according to claim 1, wherein the elastic retaining member comprises a point of attachment with the timepiece component.

13. The elastic retaining member according to claim 1, wherein the elastic retaining member is a collet for fixing the timepiece component to the support element.

14. The elastic retaining member according to claim 1, wherein the elastic retaining member is made of a silicon-based material.

15. An elastic retaining member-timepiece component assembly for a horological movement of a timepiece comprising the retaining member according to claim 1.

16. The assembly according to claim 15, wherein the assembly is made in one piece.

17. An assemblage for horological movement of the timepiece comprising the elastic retaining member-timepiece component assembly according to claim 15, wherein the assembly is fixed to the support element.

18. The horological movement comprising at least one assemblage according to claim 17.

19. The timepiece comprising the horological movement according to claim 18.

20. A method for assembling the elastic retaining member-timepiece component assembly with the support element according to claim 15, comprising:

inserting the support element into the opening of the elastic retaining member of the assembly comprising elastically deforming the elastic retaining member provided with a phase of displacing the rigid arms of the elastic retaining member inducing a double elastic deformation of the elastic arms, and fixing the retaining member on the support element comprising performing a radial elastic clamping of the retaining member on the support element.

* * * * *